(12) United States Patent
Wakao et al.

US007162637B2

(10) Patent No.: US 7,162,637 B2
(45) Date of Patent: Jan. 9, 2007

(54) IMAGE VERIFICATION SYSTEM

(75) Inventors: Satoru Wakao, Kanagawa (JP); Keiichi Iwamura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 833 days.

(21) Appl. No.: 10/323,774

(22) Filed: Dec. 20, 2002

(65) Prior Publication Data
US 2003/0126444 A1 Jul. 3, 2003

(30) Foreign Application Priority Data
Dec. 28, 2001 (JP) ............................. 2001-401661

(51) Int. Cl.
G06K 9/00 (2006.01)
H04L 9/00 (2006.01)
(52) U.S. Cl. ...................... 713/176; 382/181; 382/100; 382/190
(58) Field of Classification Search ................ 713/176; 382/100, 181, 190
See application file for complete search history.

(56) References Cited

U.S. PATENT DOCUMENTS

| 5,499,294 | A | | 3/1996 | Friedman ...................... 380/10 |
| 5,875,249 | A | * | 2/1999 | Mintzer et al. ................ 380/54 |
| 6,064,764 | A | * | 5/2000 | Bhaskaran et al. .......... 382/183 |
| 6,513,118 | B1 | * | 1/2003 | Iwamura ..................... 713/176 |
| 6,829,367 | B1 | | 12/2004 | Toyokawa et al. ........... 382/100 |
| 6,889,324 | B1 | | 5/2005 | Kanai et al. ................. 713/176 |
| 6,968,058 | B1 | | 11/2005 | Kondoh et al. |
| 7,000,112 | B1 | | 2/2006 | Oishi |
| 2001/0021251 | A1 | * | 9/2001 | Kasai ......................... 380/201 |
| 2003/0011684 | A1 | * | 1/2003 | Narayanaswami et al. ..................... 348/207.99 |
| 2003/0097568 | A1 | * | 5/2003 | Choi et al. .................. 713/176 |
| 2003/0123701 | A1 | * | 7/2003 | Dorrell et al. ............... 382/100 |
| 2004/0071311 | A1 | * | 4/2004 | Choi et al. ................... 382/100 |

FOREIGN PATENT DOCUMENTS

| JP | 9-200730 | 7/1997 |
| JP | 2000-215379 | 8/2000 |
| JP | 2001-36856 | 2/2001 |
| JP | 2001-100632 | 4/2001 |

OTHER PUBLICATIONS

Yeung et al., "An Invisible Watermarking Technique For Image Verification", IEEE, 1997, pp. 680-683.*
Wong, Ping Wah, "A Public Key Watermark for Image Verification and Authentication", IEEE, 1998, pp. 455-459.*
Kahng et al., "Watermarking Techniques for Intellectual Property Protection", DAC, Jun. 15-19, 1998, pp. 776-781.*
Memon et al., "Protecting Digital Media Content", Communications of the ACM, Jul. 1998, pp. 35-43.*

* cited by examiner

*Primary Examiner*—Matthew Smithers
(74) *Attorney, Agent, or Firm*—Fitzpatrick, Cella, Harper & Scinto

(57) ABSTRACT

An image verification system includes an imaging device and a first image verification device. The imaging device has an image generating unit which generates image data, and a first verification data generating unit which generates first verification data using the image data and common information. In the first image verification device, a first verification unit verifies whether or not the image data is modified using the image data, the first verification data, and the common information. If it is verified by the first verification unit the image data is not modified, an embedding unit embeds watermark data to detect a modified portion of the image data in order to generate watermarked image data. A second verification data generating unit generates second verification data using the watermarked image data and secret information.

30 Claims, 11 Drawing Sheets

FIG. 5A
FIG. 5
| FIG. 5A | FIG. 5B |
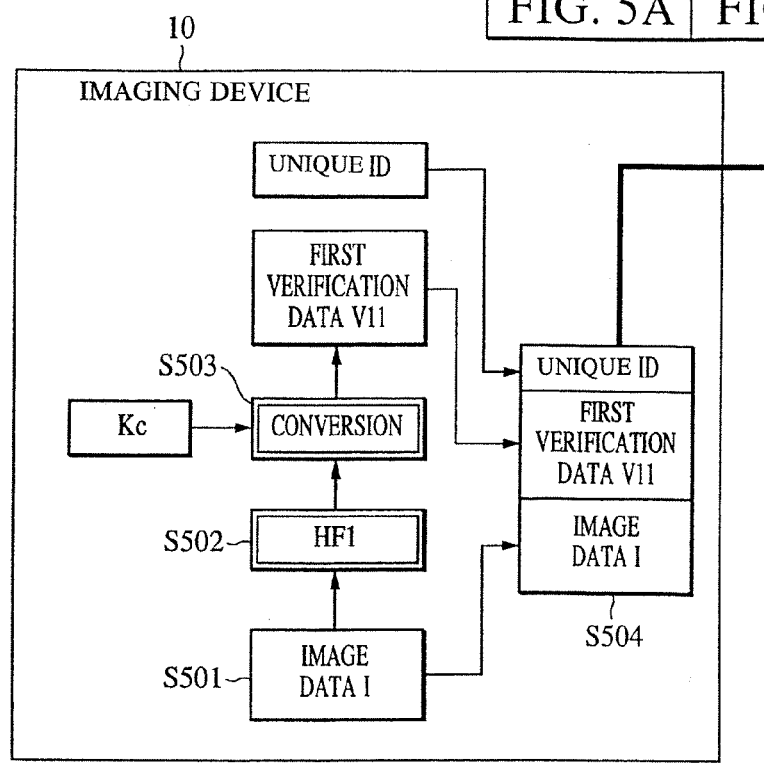
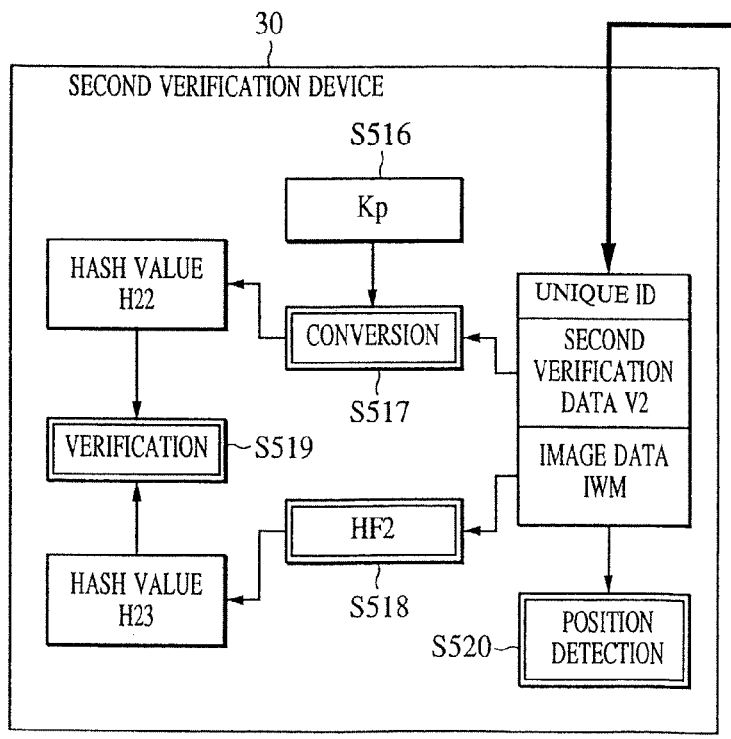

FIG. 6A

| UNIQUE ID | COMMON INFORMATION Kc | SECRET INFORMATION Ks |
|---|---|---|
| 001 | 0x1111 | 0x2222 |
| 002 | ...... | ...... |
| ...... | ...... | ...... |

FIG. 6B

| UNIQUE ID | PUBLIC INFORMATION Kp |
|---|---|
| 001 | 0x3333 |
| 002 | ...... |
| ...... | ...... |

FIG. 10
| FIG. 10A | FIG. 10B |
FIG. 10A
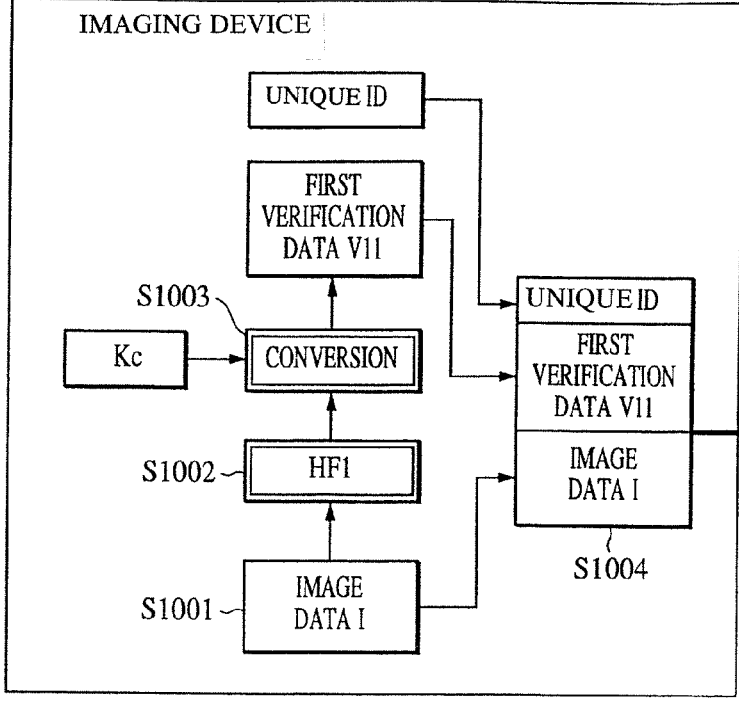
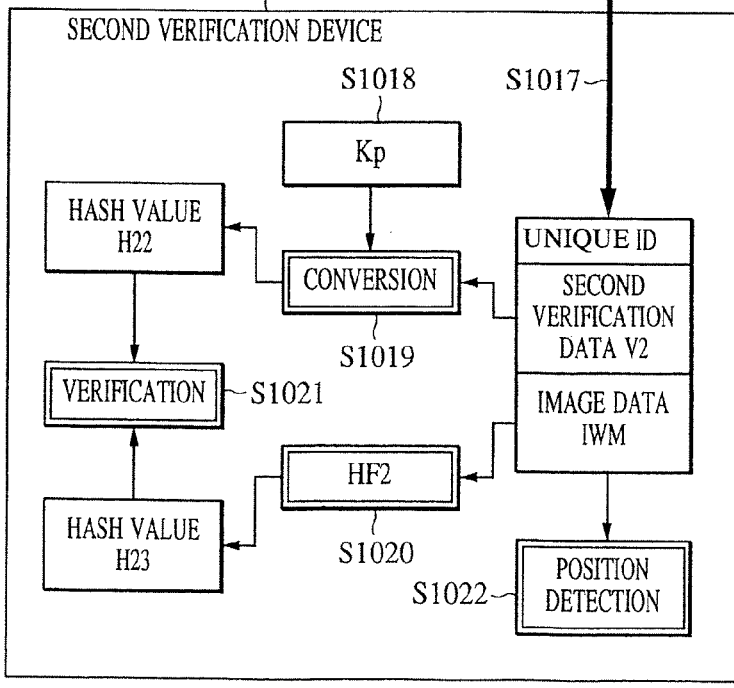

IMAGE VERIFICATION SYSTEM

BACKGROUND OF THE INVENTION

1. Field of the Invention

The present invention relates to an image verification system that verifies whether or not image data generated in an imaging device such as a digital camera has been modified.

2. Description of the Related Art

A digital camera storing a digitized optical image of an object recently has been commercialized.

Image data picked up by a digital camera can easily be stored and processed by a personal computer. A drawback may be encountered, however in that an image picked-up by a digital camera easily can be modified by a personal computer. As a result, image data shot by a digital camera may be deemed less reliable than that of a silver-salt photograph, for example, as logically admissible evidence. More recently, therefore, a digital camera system having a function of adding a digital signature to image data taken by a digital camera has been proposed. A conventional digital camera system is disclosed, for example, in a U.S. Pat. No. 5,499,294 and Japanese Patent Laid-Open No. 9-200730.

In this conventional digital camera system, although it is possible to verify whether or not image data has been modified, it is not possible to detect what portion of the image data has been modified.

SUMMARY OF THE INVENTION

An object of the present invention is to overcome the drawbacks described above.

Another object of the invention is to permit detection of a modified portion of image data generated by an imaging device, such as a digital camera.

In one aspect, the image verification system of the present invention comprises an imaging device having an image generating unit which generates image data. A first verification data generating unit generates first verification data using the image data and common information A first image verification device has a first verification unit which verifies whether or not the image data has been modified using the image data, the first verification data and the common information. If it is verified by the first verification unit that the image data has not been modified, an embedding unit embeds watermark data to detect a modified portion in the image data in order to generate a watermarked image data A second verification data generating unit generates second verification data using the watermarked image data and secret information.

In another aspect, the image verification system of the present invention has an imaging device that includes an image generating unit which generates image data. A first verification data generating unit which generates first verification data using the image data and common information. A transmitter which transmits the image data and the first verification data provided by the imaging device. a first image verificaiton device received the image data and the transmitted first verification data. The first image verification device has a first verification unit which verifies whether or not the image data has been modified using the first verification data and the common information. If the image data has not been modified, an embedding unit embeds watermark data to detect a modified portion in the image data in order to generate watermarked image data A second verification data generating unit generates second verification data using the watermarked image data and secret information.

Still other objects, features and advantage, of the present invention, will become fully apparent from the following detailed description of the preferred embodiments.

BRIEF DESCRIPTION OF THE DRAWINGS

FIG. 5, which includes FIGS. 5A and 5B, illustrates the processing procedure of the image verification system in the first embodiment of the present invention;

FIGS. 6A and 6B illustrate typical table T1 and table T2;

FIG. 10, including FIGS. 10A and 10B, illustrate the processing procedure of the image verification system in the second embodiment.

DESCRIPTION OF THE PREFERRED EMBODIMENTS (First Embodiment)

A first preferred embodiment of the present invention will now be described with reference to the drawings.

Figure 1:
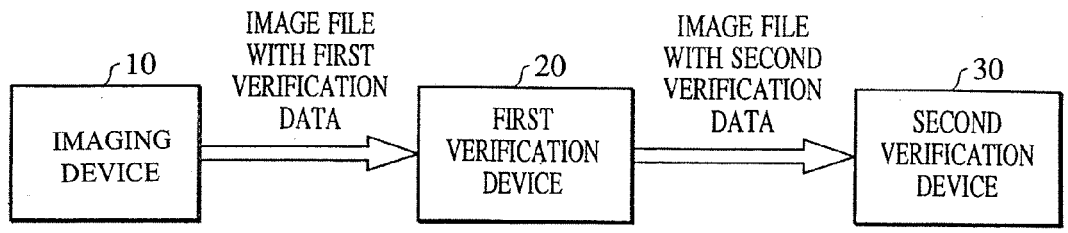
FIG. 1 illustrates a typical configuration of the image verification system in a first embodiment of the present invention.

FIG. 1 illustrates a typical configuration of the image verification system in the first embodiment of the present invention.

An imaging device 10 has a function of generating image data of an object, and a function of generating an image file with first verification data. The image file with the first verification data contains data such as image data, the first verification data of the image data, additional information of the image data, and a unique identifier (unique ID) of the imaging device 10. The imaging device 10 may be an image pickup device such as a digital camera, a digital video camera or a scanner, or a device having a camera unit. The imaging device 10 also may be a facsimile machine or a copying machine having an image reading unit.

A first verification device 20 has a function of verifying whether or not image data has been modified, i.g., using first verification data and the like. When the first verification device 20 determines that the image data has not been modified, it also has the further function of generating an image file with second verification data. The image file with second verification data contains data such as image data, second verification data of the image data, additional information relating to the image data, and a unique ID of the imaging device 10. The first verification device 20 may be an information processor, such as a personal computer.

A second verification device 30 has a function of verifying whether or not the image data has been modified, i.e., using the second verification data and the like. The second verification device 30 also may be an information processor such as a personal computer.

Figure 2:
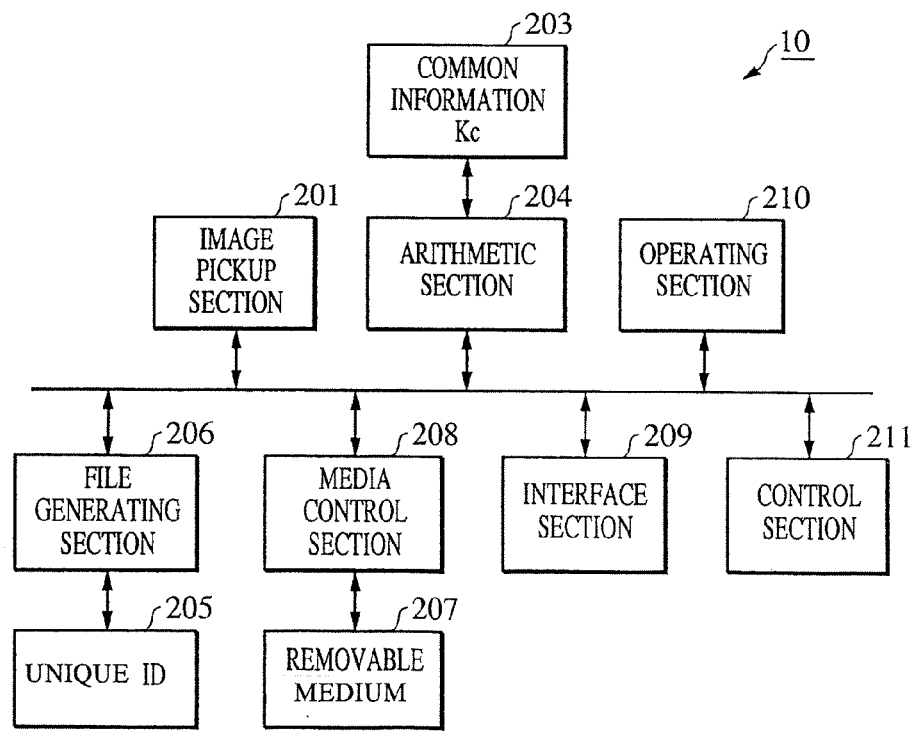
FIG. 2 is a block diagram illustrating main functions of the imaging device 10 in the first embodiment of the present invention.

FIG. 2 is a block diagram illustrating main functions of the imaging device 10 in this embodiment of the present invention.

Reference numeral 201 is an image pickup section including, for example, an optical sensor such as a CCD (charge coupled device) and a microprocessor, and generates image data I which is image data of an object.

Reference numeral 203 represents a memory storing common information Kc. The common information Kc corresponds to a common key (also known as a secret key") in a common key cryptosystem (such as DES or Rinjdael); the common key cryptosystem also is known as the symmetric cryptosystem or the secret cryptosystem.

Reference numeral 204 represents an arithmetic section which performs a first arithmetic operation generating a hash value H11 of the image data I (also referred to as a message digest or digest data) by use of a hash function HF1, and a second arithmetic operation for converting the hash value H11 generated through the first arithmetic operation into first verification data V11, by use of common information Kc held by memory 203. The first verification data V11 corresponds to a (message authentication code MAC of the image data I. The hash function HF1 may be any of MD-2, MD-4, MD-5, SHA-1, RIPEMD-128 and RIPEMD-160, or any other hash function.

Reference numeral 205 represents a memory storing a unique ID which is information unique to the imaging device 10 (for example, a manufacturing No. and a serial No. of the imaging device 10). This unique ID is added to an image file IF1 with first verification data.

Reference numeral 206 represents an image file generating section which generates an image file IF1 with first verification data. The image file IF1 with first verification data contains image data I in a data section thereof, and further contains such data as first verification data V11 of image data I, additional information of the image data I, and the unique ID of the imaging device 10 in a header section thereof. The file format of the image file IF1 with first verification data may be any of JFIF (JPEG file interchange format), TIFF (tagged image file format) and GIF (graphics interchange format), an expanded one thereof, or other image file format.

Reference numeral 207 represents a removable medium (removable memory medium) such as a magnetic disk, an optical disk and a memory card, and stores the image file IF1 with first verification data.

Reference numeral 208 represents a media control section having a function of writing the image file with first verification data into the removable medium 207 and a function of reading out the image file with first verification data from the removable medium 207.

Reference numeral 209 represents an interface section which transmits the image file with first verification data read out from the removable medium 207 to the first verification device 20.

Reference numeral 210 represents an operating section having switches for instructing generation, taking or reading of image data of an object.

Reference numeral 211 represents a control section which has a memory and a microcomputer executing control programs stored therein, and controls the functions of the imaging device 10. The memory of the control section 211 particularly stores a program for controlling a processing procedure of the imaging device 10 illustrated in FIG. 5.

Figure 3:
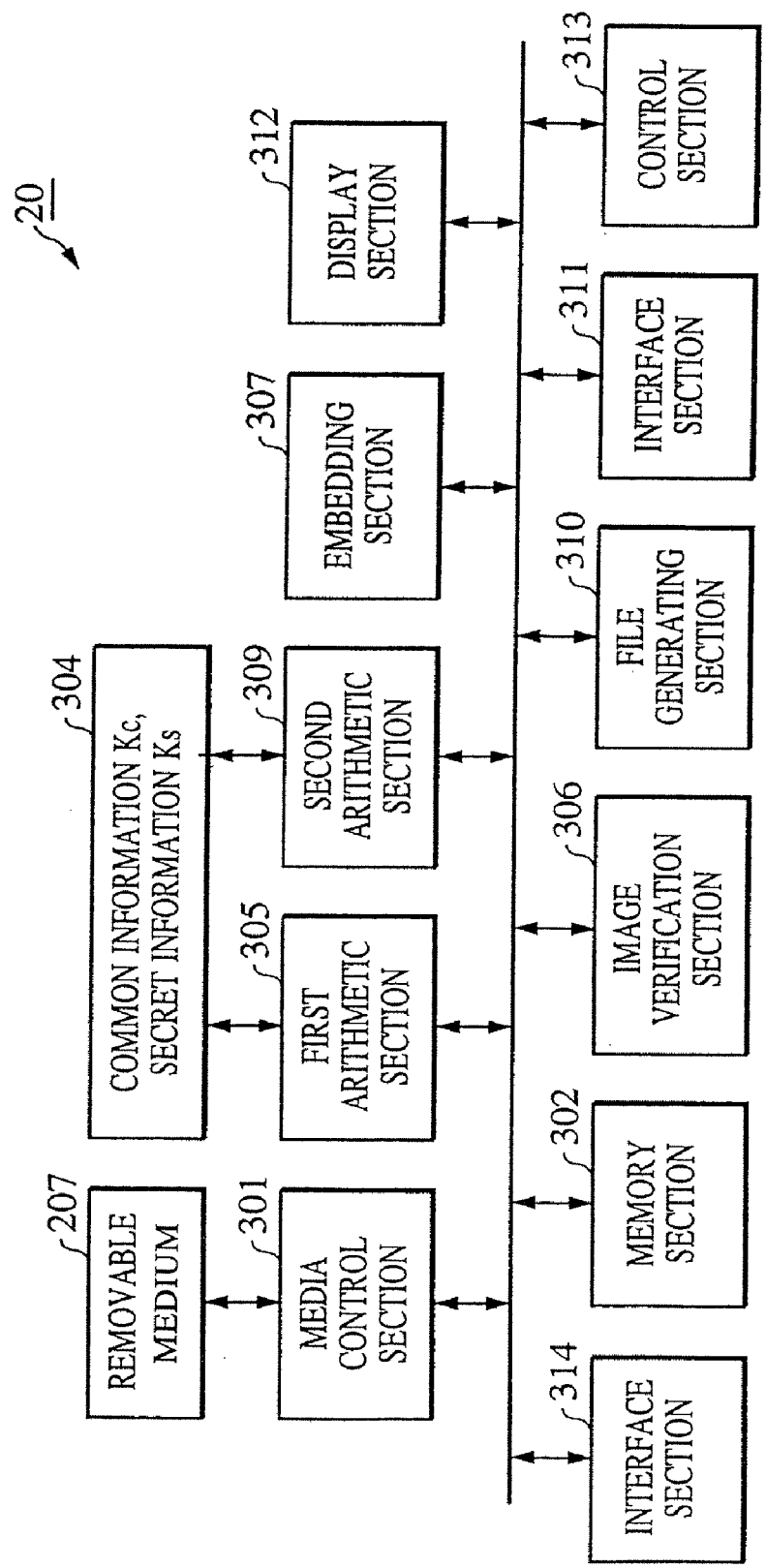
FIG. 3 is a block diagram illustrating main functions of the first verification device 20 in the first embodiment of the present invention.

FIG. 3 is a block diagram illustrating main functions of the first verification device 20 in this embodiment.

Reference numeral 301 represents a media control section which reads out the image file IF1 with first verification data from the removable medium 207.

Reference numeral 314 represents an interface section which receives the image file IF1 with first verification data transmitted from the imaging device 10.

Reference numeral 302 represents a memory section which stores the image file IF1 with first verification data and an image file IF2 with second verification data.

Reference numeral 304 represents a memory storing a table T1. A typical table T1 is illustrated in FIG. 6A. The table T1 is a management table which manages a plurality of unique IDs, pieces of common information Kc corresponding to the individual unique IDs, and pieces of secret information Ks corresponding to the individual pieces of common information Kc. For example, when the unique ID is "001", the common information Kc corresponding to this unique ID is "0x1111", and the secret information Ks corresponding thereto is "0x2222". The common information Kc and the secret information Ks are managed in secret by the first verification device 20, and are never open to the public. The secret information Ks corresponds to a private key in the public key cryptosystem (such as RSA).

Reference numeral 305 represents a first arithmetic section which performs a first arithmetic operation which generates a hash value H12 of the image data I by use of a hash function HF1, and a second arithmetic operation which converts the hash value H12 generated through the first arithmetic operation into first verification data V12 by use of the common information Kc derived from the memory 304.

Reference Numeral 306 represents an image verifying section which verifies whether or not the image data has been modified, e.g., using the first verification data V11 and the first verification data V12.

Reference numeral 307 represents an embedding section which embeds watermark data WM for detecting of a modified portion in the image data I, and generates watermarked image data IWM.

Reference numeral 309 represents a second arithmetic section which performs a first arithmetic operation which generates a hash value H21 of the image data IWM by use of a hash function HF2, and a second arithmetic operation which converts the hash value H21 generated through the first arithmetic operation into second verification data V2 by use of the secret information Ks derived from the memory 304. The second verification data V2 corresponds to a digital signature of the image data IWM. The hash function HF2 may be any of MD-2, MD-4, MD-5, SHA-1, RIPEMD-128 and RIPEMD-160, or any other hash function.

Reference numeral 310 represents an image file generating section which generates an image file IF2 with second verification data. The image file IF2 with second verification data contains image data IWM in the data section thereof, and further contains data such as second verification data V2 of the image data IWM, additional information of the image data IWM, and a unique ID of the imaging device 10.

Reference numeral 311 represents an interface section having a function of outputting the image file IF2 with second verification data to an external device.

Reference numeral 312 represents a display section which displays the result of detection of the first verification device 20. Reference numeral 313 represents a control section which has a memory and a microcomputer exceeding control programs stored in the memory, and controls functions of the first verification device 20. The memory of the control section 313 stores particularly a program for controlling the processing procedure of the first verification device 20 illustrated in FIG. 5.

Figure 4:
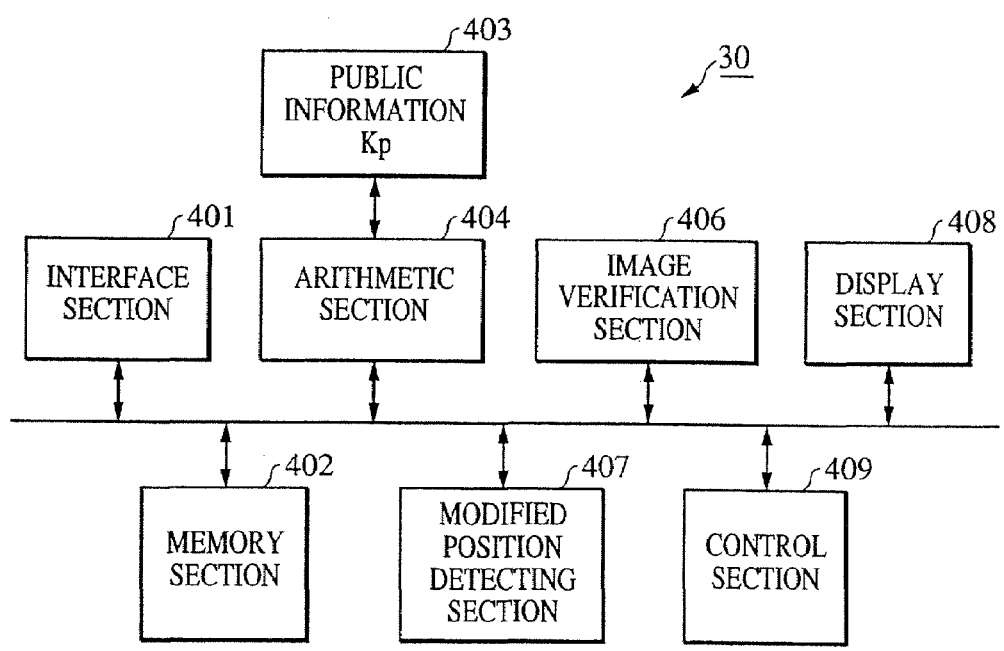
FIG. 4 is a block diagram illustrating main functions of the second verification device 30 in the first embodiment of the present invention.

FIG. 4 is a block diagram illustrating main functions of the second verification device 30 in this embodiment.

Reference numeral 401 represents an interface section having a function of entering the image file IF2 with second verification data from an external device.

Reference numeral 402 represents a memory section which stores the image file IF2 with second verification data.

Reference numeral 403 represents a memory which stores a table T2. A typical table T2 is illustrated in FIG. 6B. The table T2 is a management table which manages a plurality of unique IDs and pieces of public information Kp corresponding to the individual unique IDs. For example, when the unique ID is "001", the public information Kp corresponding to this unique ID is "0x3333". The public information Kp corresponds to the secret information Ks, and to a public key in the public key cryptosystem (such as RSA).

Reference numeral 404 represents an arithmetic section performing a first arithmetic operation which converts the second verification data V2 into a hash value H22 by use of the public information Kp derived from the memory 403, and a second arithmetic operation which generates a hash value H23 of the image data IWM by means of a hash function HF2.

Reference numeral 406 represents an image verifying section which verifies whether or not the image data IWM has been modified, e.g., using the hash value H22 and the hash value H23.

Reference numeral 407 represents a modified position detecting section which detects a modified portion of the image data I by extracting watermark data WM from the image data IWM.

Reference numeral 408 represents a display section which displays the result of detection of the image verifying section 406 and the result of detection of the modified position detecting section 407.

Reference numeral 409 represents a control section which has a memory and a microcomputer executing control programs stored in the memory, and controls functions of the second verification device 30. The memory of the control section 409 stores a program for controlling a processing procedure of the second verification device 30 illustrated in FIG. 5.

Figure 5B:
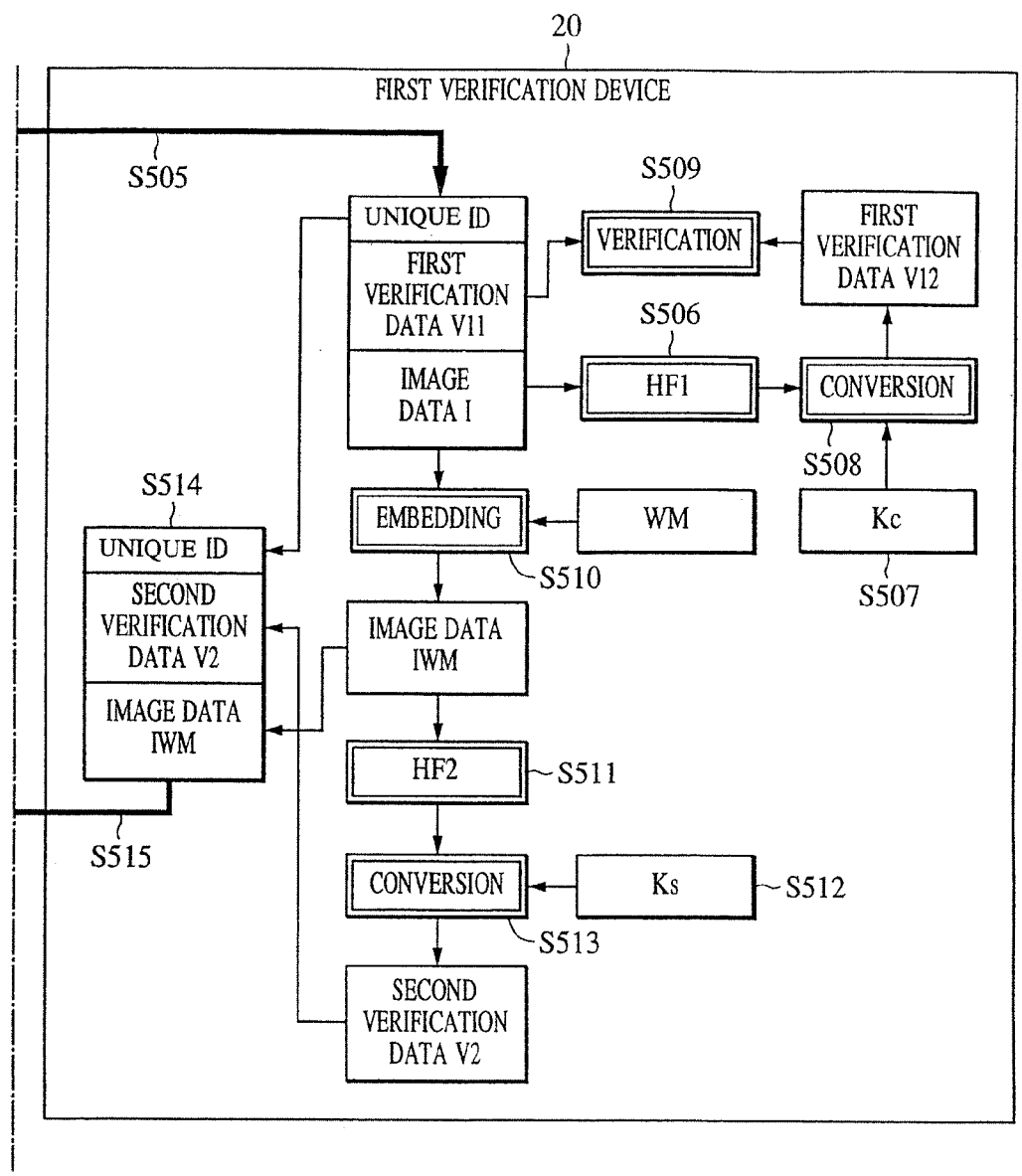

FIG. 5, which includes FIGS. 5A and 5B, illustrates the processing procedure of the image verification system in the first embodiment of the present invention.

Step S501: The image pickup section 201 generates image data I which is image data of an object, in accordance with an instruction from the user.

Step S502: The arithmetic section 204 generates a hash value H11 of the image data I by use of the hash function HF1.

Step S503: The arithmetic section 204 converts a hash value H11 into first verification data V11 using common information Kc obtained from the memory 203. This first verification data V11 corresponds to MAC of the image data I.

Step S504: The image file generating section 206 generates an image file IF1 with first verification data containing data such as the image data I, the first verification data V11, additional information of image data I, and the unique ID of the imaging device 10. The media control section 208 writes the image file IF1 into the movable medium 207.

Step S505: The user enters the image file IF1 stored by the removable medium 207 into the first verification device 20 via the removable medium 207 or the interface section 209. When input is via the removable medium 207, the media control section 301 reads out the image file IF1 from the removable medium 207, and stores the same in the memory section 302. When input is via the interface section 209, on the other hand, the interface section 314 receives the image file IF1 transmitted from the imaging device 10 to the first verification device 20, and stores the same in the memory section 302.

Step S506: The first arithmetic section 305 generates a hash value H12 of the image data I obtained from the memory section 302 by means of a hash function HF1.

Step S507: The first arithmetic section 305 obtains common information Kc corresponding to the unique ID obtained from the image file IF1 with reference to the table T1 of the memory 304.

Step S508: The first arithmetic section 305 furthermore converts the hash value H12 into first verification data V12 by use of the common information Kc obtained from the memory 304. Then, the first arithmetic section 305 supplies the first verification data to the image verifying section 306.

Step S509: The image verifying section 306 compares the first verification data V11 to the first verification data V12 to verify whether or not the image data I has been modified.

When the two first verification data are matched (i.e., when the integrity of the image data I can be verified), the image verifying section 306 determines that the image data I has not been modified. The image verifying section 306 determines that the image data I has been generated by the imaging device 10. The first verification device 20 causes the display section 312 to display information showing that the image data has not been modified, and begins generating second verification data.

When the two first verification data are not matched (i.e., when integrity of the image data I cannot be verified), on the other hand, the image verifying section 306 determines that the image data I has been modified. The first verification device 20 causes the display section 312 to display information showing that the image data I has been modified, and prohibits generation of second verification data. That is, the first verification device 20 prohibits execution of step S510 and the subsequent steps.

Step S510: When the image data I has not been modified, the embedding section 307 embeds watermark data WM for detecting of a modified portion into the image data I, and generates watermarked image data IWM.

Step S511: The second arithmetic section 309 generates a hash value H21 of the watermarked image data IWM by means of a hash function HF2.

Step S512: The second arithmetic section 309 obtains secret information Ks corresponding to the unique ID obtained from the image file IF1 with reference to the table T1 of the memory 304.

Step S513: The second arithmetic section 309 further converts the hash value H21 into second verification data V2 by use of the secret information Ks obtained from the memory 304. This second verification data corresponds to a digital signature of the image data IWM.

Step S514: The file generating section 310 generates an image file IF2 with second verification data including data such as the image data IWM, the second verification data V2, additional information of the image data IWM, and the unique ID. The image file IF2 generated in the file generating section 310 is stored in the memory section 302.

Step S515: The interface section 311 outputs the image file IF2 to an external device. The interface section 401 enters, on the other hand, the image file IF2 from the external device, and stores the same in the memory section 402.

Step S516: The arithmetic section 404 obtains public information Kp corresponding to the unique ID obtained from the image file IF2 with reference to the table T2 of the memory 403.

Step S517: The arithmetic section 404 converts the second verification data V2 into a hash value H22 by means of the second verification data and the public information Kp obtained from the memory 403.

Step S518: The arithmetic section 404 generates a hash value H23 of the image data IWM by use of a hash function HF2.

Step S519: The image verifying section 406 compares the hash value H22 obtained in step S517 and the hash value H23 obtained in step S518 to verify whether or not the image data has been modified.

When the two hash values are matched (i.e., when integrity of the image data IWM is verified), the image verifying section 406 determines that the image data IWM has not been modified. The image verifying section 406 also determines that the image data has been generated by the imaging device 10. The second verification device 30 causes a display section 408 to display information showing that the image data IWM has not been modified, and starts generating second verification data.

When the two hash values are not matched (i.e., when completeness of the image data IWM cannot be verified), on the other hand, the image verifying section 406 determines that the image data IWM has been modified. The second verification device 30 causes the display section 408 to display information showing that the image data has been modified.

Step S520: When the image data IWM has been modified, the modified position detecting section 407 extracts watermark data WM from the image data IWM, and detects a portion in which the image data has been modified. The second verification device 30 causes the display section 408 to display information showing the modified portion detected by the modified position detecting section 407.

According to the image verification system of the first embodiment, as described above, it is possible to accurately verify whether or not image data generated by the imaging device 10 has been modified, and accurately detect what portion of the image data has been modified.

According to the image verification system of the first embodiment, it is not necessary to largely improve the performance of the arithmetic resources of the imaging device 10. The cost required for the imaging device 10 can therefore be reduced.

According to the first verification device 20 of the first embodiment, it is verified whether or not the image data has been modified by means of common information Kc obtained from the unique ID of the imaging device 10. It is therefore possible to accurately confirm whether or not the image data has been generated by the imaging device 10.

According to the image verification system of the first embodiment, whether or not the image data has been modified is verified by means of secret information Ks obtained from the unique ID of the imaging device 10 and public information Kp. The second verification device 30 can therefore accurately confirm whether or not the image data has been generated by the imaging device 10.

(Second Embodiment)

A second preferred embodiment of the present invention will now be described with reference to the drawings. In the second embodiment, differences from the first embodiment will be described in detail.

Figure 7:
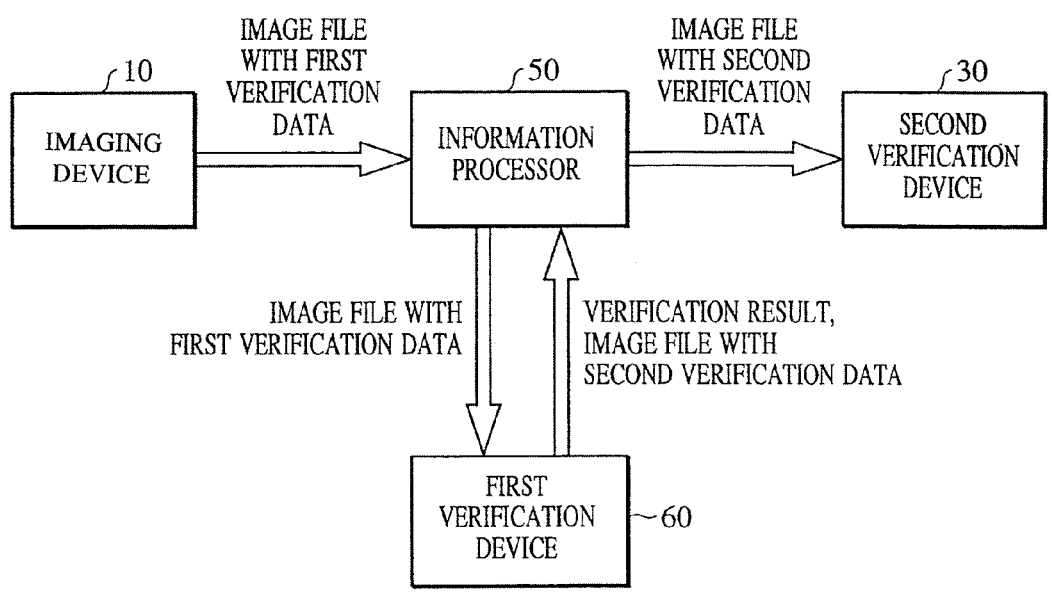
FIG. 7 illustrates a typical configuration of the image verification system in a second embodiment of the present invention.

FIG. 7 illustrates a typical configuration of the image verification system of the second embodiment.

An imaging device 10 has the same configuration and functions as those of the imaging device 10 described in the first embodiment. A second verification device 30 also has also the same configuration and functions as those of the second verification device 30 described in the first embodiment.

An information processor 50 has a function of causing a first verification device 60 to verify an image file with first verification data. The information processor 50 may be an information processor, such as a personal computer.

The first verification device 60 has a function of verifying whether or not image data has been modified, using first verification data and the like. The first verification device 60 also has a function of generating an image file with second verification data. The first verification device 60 may be a device in which it is hard to analyze common information Kc and secret information Ks described later. The first verification device 60 may therefore be a server computer using, for example, an IC card (or a memory medium with a microprocessor) or an information processor 50 as a client. When the information processor is a server computer, the first verification device 60 and the information processor 50 are connected via a network such as a LAN, a radio LAN, a WAN, or internet.

Figure 8:
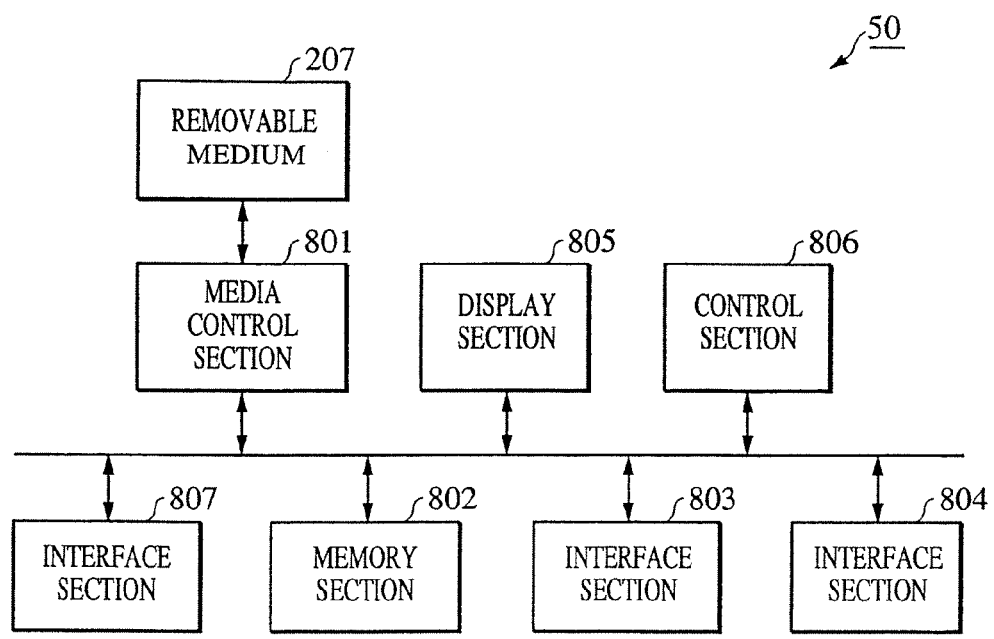
FIG. 8 is a block diagram illustrating main functions of the information processor 50 in the second embodiment of the present invention.

FIG. 8 is a block diagram illustrating main functions of the information processor 50 of the second embodiment.

Reference numeral 801 represents a media control section which reads out an image file IF1 with first verification data from a removable medium 207.

Reference numeral 807 represents an interface section which receives the image file IF1 with first verification data transmitted from the imaging device 10.

Reference numeral 802 represents a memory section which stores the image file IF1 with first verification data and an image file IF2 with second verification data.

Reference numeral 803 represents an interface section which has a function of transmitting the image file IF1 with first verification data to the first verification device 60, and a function of receiving the image file IF2 with second verification data transmitted from the first verification device 60.

Reference numeral 804 represents an interface section which has a function of outputting the image file IF2 with second verification data to an external device.

Reference numeral 805 represents a display section which displays the result of detection of the first verification device 30.

Reference numeral 806 represents a control section which has a microcomputer executing a memory and a control program stored therein, and controls functions of the information processor 50. The memory of the control section 806 stores particularly a program for controlling a processing procedure of the information processor 50 described in FIG. 10.

Figure 9:
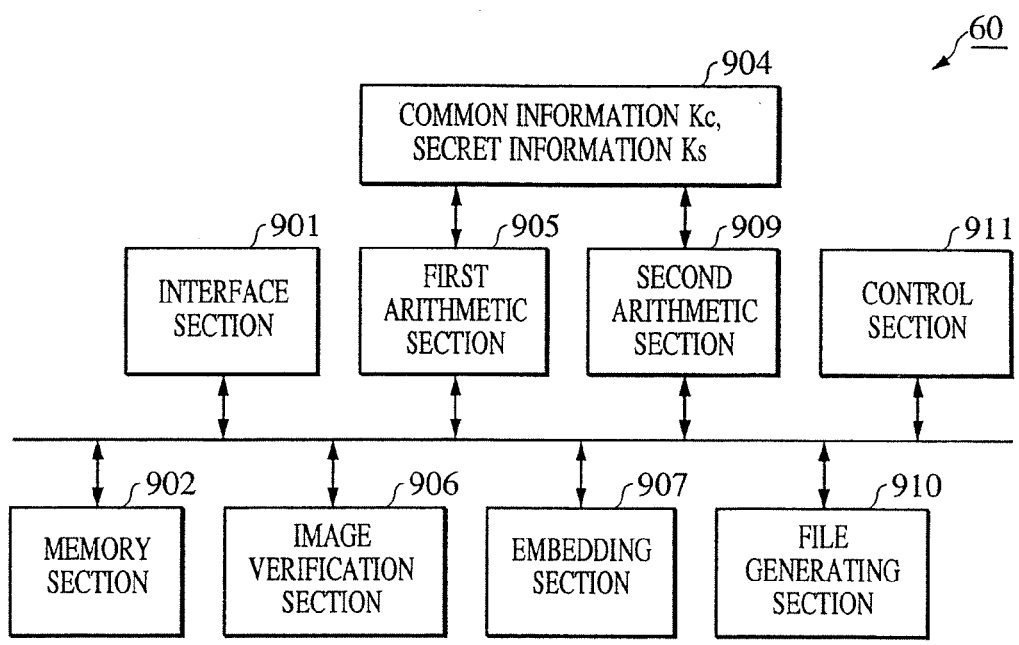
FIG. 9 is a block diagram illustrating main functions of the first verification device 60 in the second embodiment.

FIG. 9 is a block diagram illustrating main functions of the first verification device 60 of the second embodiment.

Reference numeral 901 represents an interface section which has a function of receiving the image file IF1 transmitted from the information processor 50, a function of transmitting the result of detection of the first verification device 60 to the information processor 50, and a function of transmitting the image file IF2 with second verification data to the information processor 50.

Reference numeral 902 represents a memory section which stores the image file IF1 with first verification data and the image file IF2 with second verification data.

Reference numeral 904 represents a memory storing a table T1. A typical table T1 is illustrated in FIG. 6A. The table T1 is a management table which manages a plurality of unique IDs, pieces of common information Kc corresponding to the individual unique IDs, and pieces of secret information Ks corresponding to the individual pieces of common information Kc. For example, when the unique ID is "001", the common information Kc corresponding to this unique ID is "0x1111", and the corresponding secret information is "0x2222". The common information Kc and the private information Ks are managed in a confidential manner by the first verification device 60, and are never disclosed to the public. The secret information Ks corresponds to a private key in the public key cryptosystem (such as RSA).

Reference numeral 905 represents a first arithmetic section which performs a first arithmetic operation for generating a hash value H12 of the image data I by use of a hash function HF1, and a second arithmetic operation for converting the hash value H12 generated through the first arithmetic operation into first verification data V11 by use of the common information Kc obtained from the memory 904.

Reference numeral 906 represents an image verifying section which verifies whether or not the image data I has been modified, i.g., using the first verification data V11 and the first verification data V12.

Reference numeral 907 represents an embedding section which embeds watermark data WM permitting detection of a modified position into the image data I, and generates watermarked image data IWM.

Reference numeral 909 represents a second arithmetic section which performs a first arithmetic operation for generating a hash value H21 of the image data IWM by use of a hash function HF2, and a second arithmetic operation for converting the hash value H21 generated through the first arithmetic operation into second verification data V2, by use of the secret information Ks obtained from the memory 904. The second verification data V2 corresponds to a digital signature of the image data IWM.

Reference numeral 910 represents an image file generating section which generates an image file IF2 with second verification data. The image file IF2 with second verification data contains image data in the data section thereof, and contains further data such as the second verification data V2 of the image data IWM, additional information of the image data, and the unique ID of the imaging device 10 in the header section thereof.

Reference numeral 911 represents a control section which has a memory and a microcomputer executing a control program stored therein, and controls the functions of the first verification device 60. The memory of the control section 911 stores particularly a program for controlling the processing procedure of the first verification device 60 illustrated in FIG. 10.

Figure 10B:
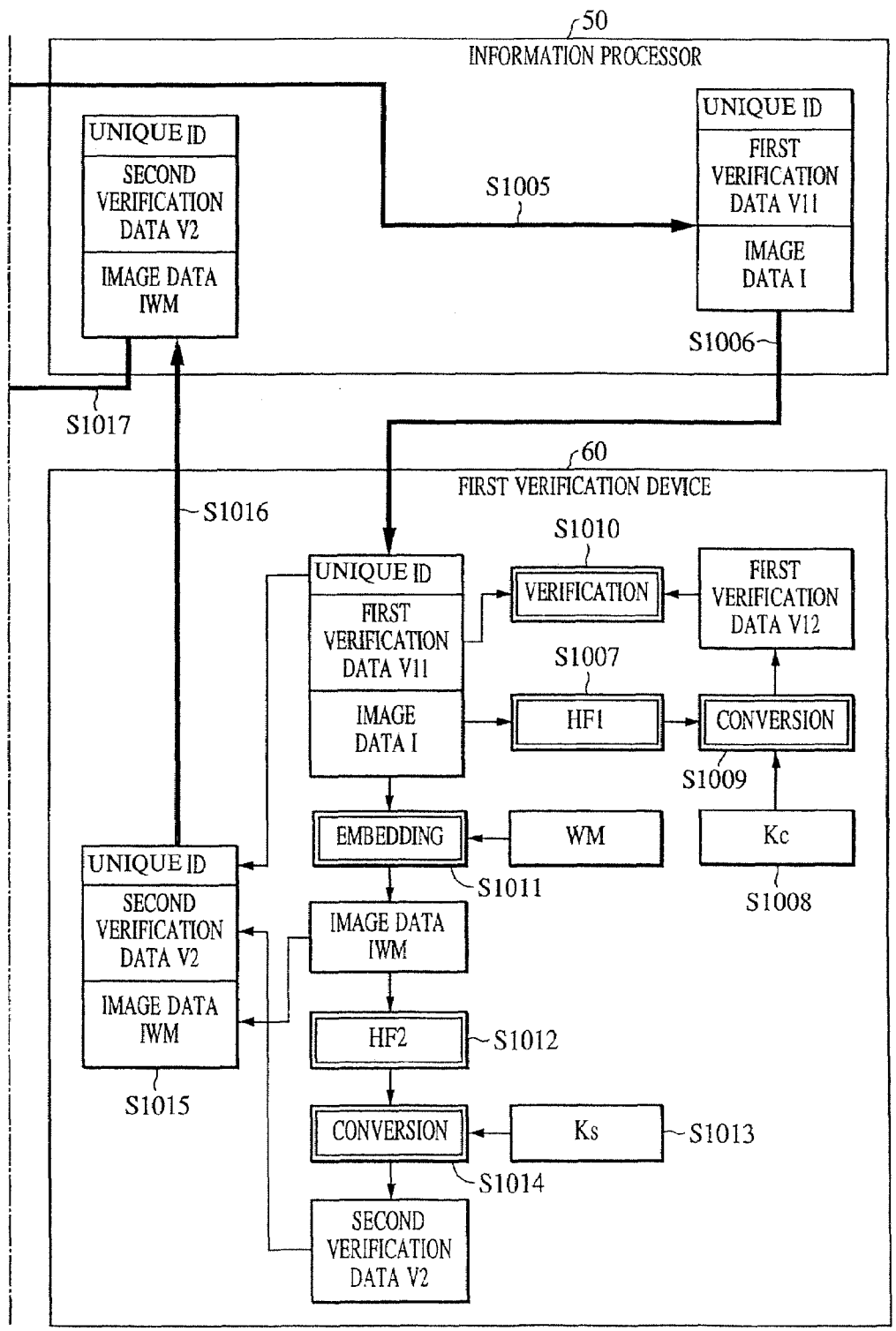

FIG. 10, including FIGS. 10A and 10B, illustrates the processing procedure of the image verification system of the second embodiment of the present invention.

Step S1001: An image pickup section 201 generates image data I which is the image data of an object, in accordance with an instruction of a user.

Step S1002: An arithmetic section 204 generates a hash value H11 of the image data I by use of a hash function HF1.

Step S1003: The arithmetic section 204 converts the hash value H11 into first verification data V11 by means of common information Kc obtained from a memory 203. The first verification data V11 corresponds to MAC of the image data I.

Step S1004: An image file generating section 206 generates an image file IF1 with first verification data containing data such as the image data I, the first verification data V11, additional information of the image data I, and the unique ID of the imaging device 10. A media control section 208 writes the image file IF1 into a removable medium 207.

Step S1005: The user enters the image file IF1 stored by the removable medium 207 into an information processor 50 via the removable medium 207 or an interface section 209. When input is via the removable medium 207, a media control section 801 reads out the image file IF1 from the removable medium 207 and stores the same in a memory section 802. When input is via the interface section 209, on the other hand, an interface section 807 receives the image file IF1 transmitted to the information processor 50, and stores the same in the memory section 802.

Step S1006: When causing a first verification device 60 to verify the image file IF1, an interface section 803 transmits the image file IF1 to a first verification device 60. An interface section 901 receives the image file IF1 and supplies the same to the memory section 902.

Step S1007: A first arithmetic section 905 generates a hash value H12 of the image data I obtained from the memory section 902 by means of a hash function HF1.

Step S1008: The first arithmetic section 905 acquires common information Kc corresponding to a unique ID obtained from the image file IF1 with reference to a table T1 of the memory 904.

Step S1009: The first arithmetic section 905 further converts the hash value H12 into first verification data V12 by use of common information Kc obtained from the memory 904.

Step S1010: An image verifying section 906 compares the first verification data V11 and the first verification data V12 to verify whether or not the image data I has been modified.

When the two first verification data are matched (i.e., when completeness of the image data I is verified), an image verifying section 906 determines that the image data I has not been modified. The image verifying section 906 further determines that the image data I has been generated by the imaging device 10. A first verification device 60 informs the information processor 50 that the image data I has not been modified, and begins generating second verification data.

When the two first verification data are not matched (i.e., when completeness of the image data I is not verified), the image verifying section 906 determines that the image data I has been modified. The first verification device 60 informs the information processor 50 that the image data I has been modified, and prohibits generation of second verification data. That is, the first verification device 60 prohibits step S1011 and the subsequent steps.

Step S1011: When the image data I has not been modified, an embedding section 907 embeds watermark data WM for detecting the modified portion into the image data I, and generates watermarked image data IWM.

Step S1012: A second arithmetic section 909 generates a hash value H21 of the watermarked image data IWM by use of a hash function HF2.

Step S1013: The second arithmetic section 909 obtains secret information Ks corresponding to the unique ID obtained from the image file IF1 with reference to a table T1 of the memory 904.

Step S1014: The second arithmetic section 909 further converts the hash value H21 into second verification data V2 using secret information Ks obtained from the memory 904. The second verification data corresponds to a digital signature of the image data IWM.

Step S1015: A file generating section 910 generates an image file IF2 with second verification data including data such as the image data IWM, the second verification data V2, additional information of the image data IWM, and the unique ID. The image file IF2 generated by the file generating section 910 is stored in the memory section 902.

Step S1016: An interface section 901 transmits the image file IF2 to the information processor 50. An interface section 803 receives the image file IF2 transmitted from the first verification device 60, and stores the same in the memory section 802.

Step S1017: An interface section 804 transmits the image file IF2 to an external device. An interface section 401 receives, on the other hand, the image file IF2 from the external device, and stores the same in a memory section 402.

Step S1018: An arithmetic section 404 obtains public information Kp corresponding to the unique ID obtained from the image file IF2 with reference to a table T2 of the memory 403.

Step S1019: The arithmetic section 404 converts the second verification data V2 into a hash value H22 by means of public information Kp obtained from the memory 403.

Step S1020: The arithmetic section 404 generates a hash value H23 of the image data IWM by use of a hash function HF2.

Step S1021: An image verifying section 406 compares the hash value H22 obtained in step S1019 and the hash value H23 obtained in step S1020 to verify whether or not the image data IWM has been modified.

When the two hash values are matched (i.e., when completeness of the image data IWM is verified), the image verifying section 406 determines that the image data IWM has not been modified. The image verifying section 406 also determines that the image data has been generated by the imaging device 10. The second verification device 30 causes the display section 408 to display information showing that the image data IWM has not been modified.

When the two has values are not matched (i.e., when completeness of the image data IWM is not verified), on the other hand, the image verifying section 406 determines that the image data IWM has been modified. The second verification device 30 causes the display section 408 to display information showing that the image data has been modified.

Step S1022: When the image data IWM has been modified, a modified position detecting section 407 extracts electronic watermarked data WM from the image data IWM, and detects the modified portion of the image data I. The second verification device 30 causes the display section 408 to display information showing the modified portion detected by the modified position detecting section 407.

According to the image verification system of the second embodiment of the present invention, as described above, it is possible to accurately verify whether or not the image data generated by the imaging device 10 has been modified and to accurately detect what portion of the image data has been modified.

According to the image verification system of the second embodiment, it is not necessary to largely improve the performance of the arithmetic resources of the imaging device 10, thus permitting reduction of the cost required for the imaging device 10.

According to the first verification device 60 of the second embodiment, whether or not the image data has been modified is verified using common information Kc obtained from the unique ID of the imaging device 10. It is therefore possible to accurately confirm whether or not the image data has been generated by the imaging device 10.

According to the second verification device 30 of the second embodiment, whether or not the image data has been modified is verified using private information Ks obtained from the unique ID of the imaging device 10 and public information Kp. It is therefore possible to accurately confirm whether or not the image data has been generated by the imaging device 10.

According to the image verification system of the second embodiment, the possibility of leakage of the common information Kc and the secret information Ks can be reduced and safety of these data can be improved by achieving the first verification device 60 in a server computer using an IC card (or a memory medium having a microprocessor) or an information processor as a client.

This embodiment can be achieved by execution of a program by a computer. The present invention thus is applicable also to means for supplying a program to a computer, such as a recording medium such as a CD-ROM recording a program, or a transmission medium such as internet transmitting such a program, as preferred embodiments of the present invention. The above-mentioned program, recording medium and transmission medium are included within the subject matter of the present invention. Applicable recording media include, for example, a flexible disk, a hard disk, an optical disk, a magneto-optical disk, a CD-ROM, a magnetic tape, non-volatile memory card, and a ROM.

The aforementioned embodiments are only examples of application for achievement of the present invention. The technical scope of the present invention should not be limited to these embodiments. More specifically, the present invention can be applied in various forms without departing from the technical idea or the main features thereof.

The scope of the present invention is defined by the scope of the appended claims, and is not limited to only the specific descriptions in this specification. Furthermore, all modifications and changes constituting to equivalents of the claimed features are considered to fall within the scope of the claims of the present invention.

What is claimed is:

1. An image verification system comprising:
   an imaging device including (a) an image generating unit which generates image data, and (b) a first verification data generating unit which generates first verification data using the image data and common information; and
   a first image verification device including (a)
      a first verification unit which verifies whether or not the image data is modified, using the image data, the first verification data, and the common information, (b) an embedding unit which, if it is verified by the first verification unit that the image data is not modified, embeds watermark data for detecting a modified portion of the image data so as to generate watermarked image data, and (c) a second verification data generating unit which generates second verification data using the watermarked image data and secret information.

2. An image verification system according to claim 1, wherein the common information corresponds to a secret key in a common key cryptosystem.

3. An image verification system according to claim 1, wherein the secret information corresponds to a private key in a public key cryptosystem.

4. An image verification system according to claim 1, wherein if it is verified by the first verification unit that the image data is modified, the second verification data generating unit disables generation of the second verification data.

5. An image verification system according to claim 1, further comprising:
a second image verification device including (a) a second verification unit which verifies whether or not the watermarked image data is modified, using the verification data and public information, and (b) a modified portion detecting unit which, if it is verified by the second verification unit that the watermarked image data is modified, detects a modified portion using the watermark data embedded in the watermarked image data.

6. An image verification system according to claim 5, wherein the public information corresponds to a public key in a public key cryptosystem.

7. An image verification system according to claim 1, wherein the imaging device is one of a digital camera, a digital video camera, a scanner, a facsimile machine, and a copying machine.

8. An image verification system according to claim 1, wherein the first image verification device is one of an IC card, and a memory medium comprising a microprocessor.

9. An image verification system comprising:
an imaging device including (a) an image generating unit which generates image data, (b) and a first verification data generating unit which generates first verification data using the image data and common information;
a transmitter which transmits the image data and the first verification data provided by the imaging device; and
a first image verification device that receives the image data and the first verification data transmitted by the transmitter,
wherein the first image verification device includes (a) a first verification unit which verifies whether or not the image data is modified, using the image data, the first verification data, and the common information, (b) an embedding unit which, if it is verified by the first verification unit that the image data is not modified, embeds watermark data for detecting a modified portion of the image data so as to generate watermarked image data, and (c) a second verification data generating unit which generates second verification data using the watermarked image data and secret information.

10. An image verification system according to claim 9, wherein the common information corresponds to a secret key in a common key cryptosystem.

11. An image verification system according to claim 9, wherein the secret information corresponds to a private key in a public key cryptosystem.

12. An image verification system according to claim 9, wherein if it is verified by the first verification unit that the image data is modified, the second verification data generating unit disables generation of the second verification data.

13. An image verification system according to claim 9, further comprising:
a second image verification device including (a) a second verification unit which verifies whether or not the watermarked image data is modified, using the second verification data and public information, and (b) a modified portion detecting unit which, if it is verified by the second verification unit that the watermarked image data is modified, detects a modified portion using the watermark data embedded in the watermarked image data.

14. An image verification system according to claim 13, wherein the public information corresponds to a public key in a public key cryptosystem.

15. An image verification system according to claim 9, wherein the imaging device is one of a digital camera, a digital video camera, a scanner a facsimile machine, and a copying machine.

16. An image verification system according to claim 9, wherein the first image verification device is one of an IC card, and a memory medium comprising a microprocessor.

17. An image verification system according to claim 9, wherein the first image verification device is a server computer and the transmitter is a client.

18. An image verification device comprising:
an image verification unit which verifies whether or not image data generated by an imaging device is modified, using the image data, first verification data, and common information;
an embedding unit which, if it is verified by the image verification unit that the image data is not modified, embeds watermark data for detecting a modified portion of the image data so as to generate watermarked image data; and
a verification data generating unit which generates second verification data using the watermarked image data and secret information.

19. An image verification device according to claim 18, wherein the common information corresponds to a secret key in a common key cryptosystem.

20. An image verification device according to claim 18, wherein the secret information corresponds to a private key in a public key cryptosystem.

21. An image verification device according to claim 18, wherein if it is verified by the image verification unit that the image data is modified, the verification data generating unit disables generation of the second verification data.

22. An image verification device according to claim 18, wherein the image verification device is one of an IC card, and a memory medium comprising a microprocessor.

23. An image verification device according to claim 18, wherein the imaging device is one of a digital camera, a digital video camera, a scanner, a facsimile machine, and a copying machine.

24. An image verifying method comprising the steps of:
verifying whether or not image data generated by an imaging device is modified, using the image data, first verification data, and common information;
if it is verified in the verifying step that the image data is not modified, embedding watermark data for detecting a modified portion of the image data so as to generate watermarked image data; and
generating second verification data using the watermarked image data and secret information.

25. An image verifying method according to claim 24, wherein the common information corresponds to a secret key in a common key cryptosystem.

26. An image verifying method according to claim 24, wherein the secret information corresponds to a private key in a public cryptosystem.

27. An image verifying method according to claim 24, further comprising:
if it is verified in the first step that the image data is modified, disabling generation of the second verification data.

28. An image verifying method according to claim 24, wherein the image verifying method is executed in one of an IC card, and a memory medium comprising a microprocessor.

29. An image verifying method according to claim 24, wherein the image data is generated in one of a digital camera, a digital video camera, a scanner, a facsimile machine, and a copying machine.

30. A computer readable recording medium storing a program executing an image verifying method, the image verifying method comprising the steps of:

verifying whether or not image data generated by an imaging device is modified, using the image data, first verification data, and common information;

if it is verified in the verifying step that the image data is not modified, embedding watermark data for detecting a modified portion of the image data so as to generate watermarked image data; and generating second verification data using the watermarked image data and secret information.

* * * * *

UNITED STATES PATENT AND TRADEMARK OFFICE
CERTIFICATE OF CORRECTION

| | | |
|---|---|---|
| PATENT NO. | : 7,162,637 B2 | Page 1 of 2 |
| APPLICATION NO. | : 10/323774 | |
| DATED | : January 9, 2007 | |
| INVENTOR(S) | : Wakao et al. | |

It is certified that error appears in the above-identified patent and that said Letters Patent is hereby corrected as shown below:

ON THE TITLE PAGE:
At Item (57), Abstract, Line 10, "unit the" should read --unit that the--.

COLUMN 1:
Line 49, "data A" should read --data. A--.
Line 56, "which" should be deleted.
Line 58, "which" should be deleted.
Line 59, "device. a" should read --device. A--.
Line 60, "received" should read --receives--.
Line 67, "data A" should read --data. A--.

COLUMN 2:
Line 4, "advantage," should read --advantages,--.
Line 60, "i.g.," should read --e.g.,--.

COLUMN 3:
Line 4, "i.g.," should read --e.g.,--.
Line 17, "secret" should read --"secret--.
Line 29, "(message" should read --message--.

COLUMN 9:
Line 32, "i.g.," should read --e.g.,--.

COLUMN 11:
Line 48, "has" should read --hash--.

COLUMN 12:
Lines 59 and 60 should be merged into a single paragraph.

UNITED STATES PATENT AND TRADEMARK OFFICE
CERTIFICATE OF CORRECTION

PATENT NO. : 7,162,637 B2
APPLICATION NO. : 10/323774
DATED : January 9, 2007
INVENTOR(S) : Wakao et al.

It is certified that error appears in the above-identified patent and that said Letters Patent is hereby corrected as shown below:

COLUMN 14:
Line 17, "scanner a" should read --scanner, a--.

Signed and Sealed this

Sixteenth Day of September, 2008

JON W. DUDAS
*Director of the United States Patent and Trademark Office*